US010654204B2

(12) United States Patent
Sun et al.

(10) Patent No.: US 10,654,204 B2
(45) Date of Patent: May 19, 2020

(54) METHOD FOR FORMING ENCAPSULATION ASSEMBLY, AND VEHICLE WINDOW

(71) Applicants: Yang Sun, Shanghai (CN); Ce Shi, Shanghai (CN); Xiaohui Guo, Shanghai (CN)

(72) Inventors: Yang Sun, Shanghai (CN); Ce Shi, Shanghai (CN); Xiaohui Guo, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 36 days.

(21) Appl. No.: 15/562,650

(22) PCT Filed: Feb. 19, 2016

(86) PCT No.: PCT/CN2016/074115
§ 371 (c)(1),
(2) Date: Sep. 28, 2017

(87) PCT Pub. No.: WO2016/155428
PCT Pub. Date: Oct. 6, 2016

(65) Prior Publication Data
US 2018/0085979 A1 Mar. 29, 2018

(30) Foreign Application Priority Data
Mar. 31, 2015 (CN) .......................... 2015 1 0149434

(51) Int. Cl.
*B32B 3/10* (2006.01)
*B29C 45/14* (2006.01)
(Continued)

(52) U.S. Cl.
CPC .. *B29C 45/14811* (2013.01); *B29C 45/14311* (2013.01); *B29C 45/14336* (2013.01);
(Continued)

(58) Field of Classification Search
None
See application file for complete search history.

(56) References Cited

U.S. PATENT DOCUMENTS 5,475,956 A * 12/1995 Agrawal ................. B29C 35/08
296/201
6,089,646 A * 7/2000 Xu ............................ B60J 1/10
296/146.15
(Continued)

FOREIGN PATENT DOCUMENTS

CN 103057384 A 4/2013
CN 104243640 A 12/2014
(Continued)

OTHER PUBLICATIONS

International Search Report as issued in International Patent Application No. PCT/CN2016/074115, dated May 24, 2016.
(Continued)

*Primary Examiner* — Christopher M Polley
(74) *Attorney, Agent, or Firm* — Pillsbury Winthrop Shaw Pittman LLP

(57) ABSTRACT

A method for forming an encapsulation assembly, and a vehicle window are provided. The method includes: providing a reinforcement component; forming a primer layer covering a surface of the reinforcement component; performing a heating treatment on the reinforcement component after the primer layer is formed, to elevate a temperature of the reinforcement component; and injecting a gasket material in a mold onto the surface of the reinforcement component with elevated temperature to form a gasket. The vehicle window includes a glass; and the encapsulation assembly formed by the above method. The gasket may bind with the primer layer more closely. That is to say, binding force between the reinforcement component and the gasket (Continued)

may be increased. In this way, the gasket may not easily detach from the reinforcement component.

10 Claims, 2 Drawing Sheets

(51) Int. Cl.
  *B60J 10/78* (2016.01)
  *B60J 10/70* (2016.01)
  *B60J 1/08* (2006.01)

(52) U.S. Cl.
  CPC .. *B29C 45/14434* (2013.01); *B29C 45/14631* (2013.01); *B60J 1/08* (2013.01); *B60J 10/70* (2016.02); *B60J 10/78* (2016.02); *B29C 2045/14868* (2013.01); *B29K 2715/006* (2013.01)

(56) References Cited

U.S. PATENT DOCUMENTS

2010/0136348 A1  6/2010  Nakata
2011/0042848 A1  2/2011  Ash et al.

FOREIGN PATENT DOCUMENTS

EP        1 052 129 A1    11/2000
JP        2002-347123 A   12/2002

OTHER PUBLICATIONS

Notice of Reasons for Refusal as issued in Japanese Patent Application No. 2017-550876, dated Jan. 28, 2020.
Office Action as issued in Brazilian Patent Application No. 112017020589-0, dated Feb. 10, 2020.

* cited by examiner

METHOD FOR FORMING ENCAPSULATION ASSEMBLY, AND VEHICLE WINDOW

CROSS-REFERENCE TO RELATED APPLICATIONS

This application is the U.S. National Stage of PCT/CN2016/074115, filed on Feb. 19, 2016, which in turn claims priority to Chinese patent application No. 201510149434.2, filed on Mar. 31, 2015, and entitled "METHOD FOR FORMING ENCAPSULATION ASSEMBLY, AND VEHICLE WINDOW". The content of these applications are incorporated herein by reference in their entireties.

TECHNICAL FIELD

The present disclosure generally relates to vehicle field, and more particularly, to a method for forming an encapsulation assembly, and a vehicle window.

BACKGROUND

An encapsulation assembly with a seal function is often disposed between a vehicle window and a bodywork of a vehicle, so that the seal performance of the window is improved and thus the window can be fitted well in the bodywork of the vehicle.

Generally, the encapsulation assembly should possess a certain degree of rigidity as well as good flexibility. The flexibility requirement is based on a consideration that an encapsulation assembly having good flexibility can fit the bodywork of the vehicle well, and thus ensures good seal performance, while the rigidity requirement for the encapsulation assembly can ensure that a main body of the encapsulation assembly remains its original shape in use, so that a portion of the encapsulation assembly in contact with the bodywork of the vehicle can be pressed tightly with the bodywork of the vehicle. In addition, when the encapsulation assembly is used in a triangular window, a pin may be used to mount the triangular window onto the bodywork of the vehicle. Generally, one end of the pin is encapsulated in the encapsulation assembly. A certain degree of rigidity of the encapsulation assembly may keep the pin in place.

An existing method including two steps of injection molding has been developed to provide an encapsulation meeting the requirements of both flexibility and rigidity, wherein a main body of the encapsulation assembly with a degree of rigidity is formed around a piece of glass, and then a lip component having good flexibility is further formed on a surface of the main body.

However, the existing method including two injection molding processes is high both in process complexity and cost.

SUMMARY

To meet the requirements on both flexibility and rigidity, a rigid reinforcement component is provided in an encapsulation assembly according to an aspect of the present disclosure. The rigid reinforcement component is bound with a gasket to form an encapsulation assembly which encapsulates edges of a piece of glass. The rigid reinforcement component supports the gasket, so that the gasket can remain its original shape in use. Besides, the reinforcement component may provide a stable mounting location for other components, such as a bright trim or a pin. In addition, the reinforcement component can be disposed into a mold together with the glass in an injection molding process, so that the gasket can encapsulate the reinforcement component and then be fixed to the glass. Therefore, the method of an embodiment of the present disclosure does not increase process complexity.

During developing an encapsulation assembly with a reinforcement component, inventors found that a binding force between a gasket and the reinforcement component is lower than a binding force between the gasket and a glass, which causes the reinforcement component to detach from the gasket. The detachment affects not only a production yield of the encapsulation assembly, but also, when the encapsulation assembly encapsulates the glass to form a vehicle window, security of the vehicle window potentially resulted from the glass separating from a framework of a bodywork of a vehicle. Based on many an experiment, inventors found a method for enhancing the binding force between the gasket and the reinforcement component.

In one aspect, a method for forming an encapsulation assembly is provided. The method includes: providing a reinforcement component; forming a primer layer covering a surface of the reinforcement component; heating the reinforcement component, to elevate a temperature of the reinforcement component; and injecting a gasket material in a mold onto the surface of the reinforcement component with elevated temperature to form a gasket.

A basic idea is that heating the reinforcement component after the primer layer is formed to elevate the temperature of the reinforcement component may also elevate a temperature of the primer layer on the surface of the reinforcement component. In the subsequent process of injecting the gasket material in a mold onto the surface of the reinforcement component to form the gasket, chemical activity of the primer layer may be increased, and a reaction temperature between the primer layer and the gasket material may be elevated, which drives the gasket to closely attach to the primer layer. That is to say, the binding force between the reinforcement component and the gasket is enhanced, such that the gasket may not easily detach from the reinforcement component.

Further, the reinforcement component is provided with an antirust layer, and the surface of the antirust layer is cleaned before the primer layer is formed on the surface of the reinforcement component. The cleaning process may remove impurity particles or oil contamination on the surface of antirust layer. In this way, a clean and even surface is provided, which is beneficial for the formation of the primer layer and further enhances the binding force between the antirust layer and the primer layer.

In another aspect, a vehicle window is provided, including: a glass; and the encapsulation assembly formed by the above method.

A basic idea is that heating the reinforcement component after the primer layer is formed to elevate the temperature of the reinforcement component may also elevate a temperature of the primer layer on the surface of the reinforcement component. In the subsequent process of injecting the gasket material in a mold onto the surface of the reinforcement component to form the gasket, chemical activity of the primer layer may be increased, and a reaction temperature between the primer layer and the gasket material may be increased, which drives the gasket to closely attach to the primer layer. That is to say, the binding force between the reinforcement component and the gasket is enhanced, such that the gasket may not easily detach from the reinforcement component. This may further enhance security as well as stability and firmness of the vehicle window.

DETAILED DESCRIPTION

In existing techniques, binding force between a gasket and a reinforcement component is relatively low, which may cause the reinforcement component to easily detach from the gasket. This may not only affect a production yield of a formed encapsulation assembly, but also cause a potential safety hazard in use.

Figure 1:
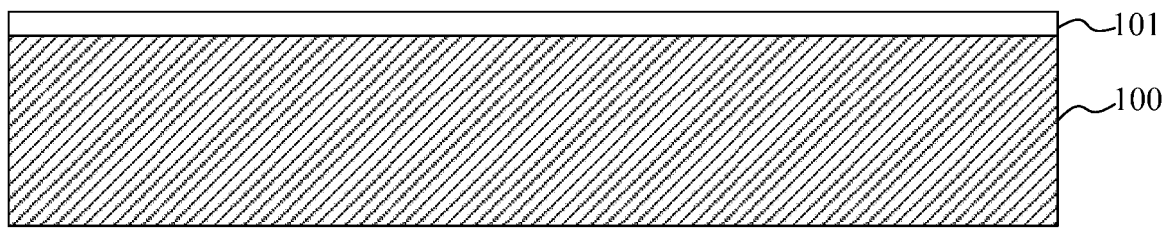
FIGS. 1 to 4 are cross-sectional views schematically illustrating intermediate structures of a method for forming an encapsulation assembly according to an embodiment of the present disclosure.
Figure 2:
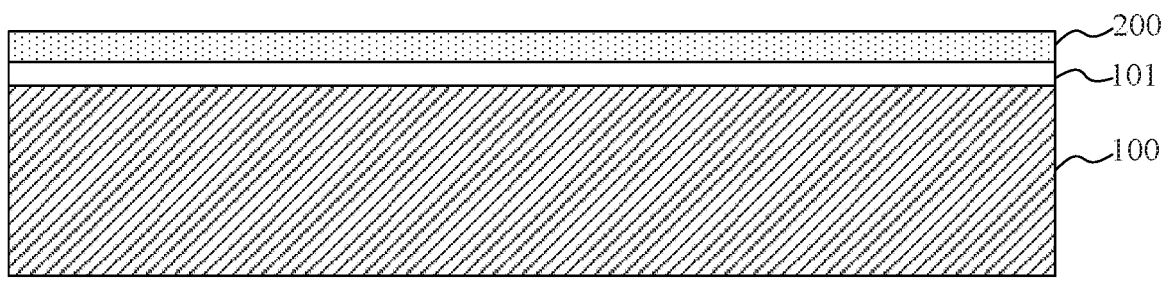
Figure 3:
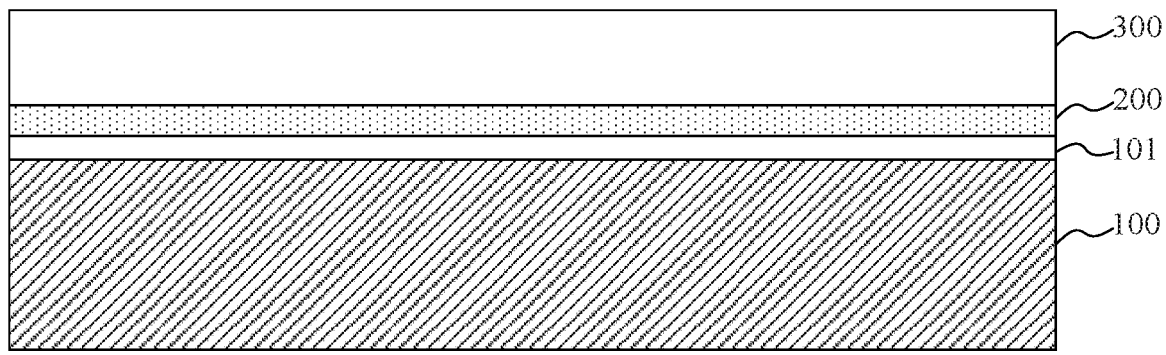

In embodiments of the present disclosure, a method for forming an encapsulation assembly is provided. FIGS. 1 to 3 are cross-sectional views schematically illustrating intermediate structures of a method for forming an encapsulation assembly according to an embodiment of the present disclosure.

Referring to FIG. 1, a reinforcement component 100 is provided. The reinforcement component 100 may be adapted to support a gasket to be formed subsequently.

In some embodiments, the reinforcement component 100 may include iron. It should be noted that, the present disclosure is not limited thereto. In some embodiments, the reinforcement component 100 may include other materials, such as iron alloy, aluminum or aluminum alloy.

In some embodiments, the reinforcement component 100 may have an antirust layer 101 formed thereon. In subsequent processes, a primer layer may be formed on the antirust layer 101. The antirust layer 101 is adapted to protect the reinforcement component 100. For example, the antirust layer 101 may prevent the reinforcement component 100 from contacting with external environment directly, such that the reinforcement component 100 may not be oxidized or corroded.

In FIG. 1, the antirust layer 101 is illustrated disposed on an upper surface of the reinforcement component 100. It should be noted that, the antirust layer 101 covers the surface of the whole reinforcement component 100, so that the reinforcement component 100 may be protected completely.

In some embodiments, the antirust layer 101 may include epoxy resin, as it is easy to control its forming process, and epoxy resin possesses good acoustic shielding ability. It should be noted that, the present disclosure is not limited thereto.

In some embodiments, before a primer layer is formed and after the antirust layer 101 is formed, the method may further include following processes: cleaning a surface of the antirust layer 101. The cleaning process is adapted to remove impurity particles or oil contamination on the surface of the antirust layer 101. In this way, a clean and even surface is provided for the primer layer, which is beneficial for the formation of the primer layer and further enhances the binding force between the antirust layer 101 and the primer layer to be formed subsequently.

Referring to FIG. 2, after the surface of the antirust layer 101 is cleaned, a primer layer 200 is formed covering the surface of the reinforcement component 100. The primer layer 200 is used to enhance binding force between the reinforcement component 100 and the gasket to be formed subsequently.

In some embodiments, if the antirust layer 101 is formed on the surface of the reinforcement component 100, the primer layer 200 is formed covering the surface of the antirust layer 101.

In some embodiments, a coating process may be employed to form the primer layer 200, which is suitable for forming the primer layer 200 with an even surface. However, the present disclosure is not limited thereto. In some embodiments, the primer layer 200 may be formed by a spraying process or a dipping process. In some embodiments, the dipping process may include: providing a reagent tank which contains a material of the primer layer 200 therein; and dipping the reinforcement component 100 into the tank to form the primer layer 200 on the surface of the reinforcement component 100.

In some embodiments, the primer layer 200 may be formed following below processes. A primer material is formed on the surface of the reinforcement component 100, and performed with a drying treatment to make a solvent in the primer material volatilize, to form the primer layer 200.

In the embodiment, a primer material of a solvent-base solvent is formed which includes polyurethane and/or a precursor of polyurethane. In some embodiments, the precursor may include isocyanate. That is to say, an effective element in the primer material is polyurethane.

Although the solvent-base solvent is used in above embodiments, the present disclosure is not limited thereto. In some embodiments, a primer material of a water-base solvent is formed. In some embodiments, the primer material of the water-base solvent includes chlorinated polyolefin or silane.

In some embodiments, performing a drying treatment to the primer material may include: laying the reinforcement component 100 aside which has the primer material formed thereon for a duration ranging from half an hour to forty-eight hours, to make the solvent in the primer material volatilize. With this duration, production efficiency is not affected due to the duration being not too long, and the solvent in the primer material can volatilize completely due to the duration being not too short.

It should be noted that, the above duration is just an example. In practice, the duration may be adjusted according to practical situations, such as an ambient temperature or specific components of the primer material.

The reinforcement component 100 which has the primer layer 200 formed thereon is heated after the primer layer 200 is formed, to elevate a temperature of the reinforcement component 100. With the heating process, a temperature of both the reinforcement component 100 and the primer layer 200 is elevated, such that the primer layer 200 is activated. Specifically, elevating the temperature increases chemical activity of the primer layer 200. For example, dangling bonds contained in the primer layer 200 may be increased, and thus more chemical bonds contained in the primer layer 200 can bind with molecular bonds in the gasket material when the primer layer 200 contacts with the gasket material. As a result, the binding performance between the primer layer 200 and the gasket material is strengthened and thus the binding force is increased.

Further, regarding the chemical kinetics, the elevated temperature increases a rate of binding between molecular bonds in the primer layer 200 and the molecular bonds in the gasket material, which may drive the binding between the primer layer 200 and the gasket material as well, and further ensure a stable connection between the gasket and the primer layer 200. That is to say, the binding force between the reinforcement component 100 and the gasket may be enhanced, such that the gasket may not easily detach from the reinforcement component 100.

In some embodiments, the heating process may elevate the temperature of the reinforcement component 100 up to 60° C. to 90° C. With this temperature range, the primer layer 200 on the surface of the reinforcement component 100 can be activated enough to increase the binding force between the reinforcement component 100 and the gasket, without changing the chemical properties of the primer layer 200.

In some embodiments, the reinforcement component 100 with the primer layer 200 formed thereon may be heated in a baking oven, to elevate the temperature of the reinforcement component 100, which is a simple way to implement. However, the present disclosure is not limited thereto. In some embodiments, other heating ways can be used to elevate the temperature of the reinforcement component 100.

Referring to FIG. 3, in some embodiments, after the reinforcement component 100 with the primer layer 200 formed thereon is heated, an injection molding process of a gasket material is performed onto the surface of the reinforcement component 100 to form a gasket 300.

As described above, the primer layer 200 on the heated reinforcement component 100 can bind with the gasket material better, which enhances the binding force between the gasket 300 and the reinforcement component 100.

In some embodiments, the gasket 300 may be formed by following processes. The heated reinforcement component 100 is disposed into a cavity of an injection mold, a molten gasket material is injected into the cavity and contacts with the primer layer 200 on the surface of the heated reinforcement component 100 in the cavity, and the molten gasket material is cooled to mold, to form the gasket 300. The gasket 300 and the reinforcement component 100 constitute the encapsulation assembly.

In some embodiments, the gasket 300 may include polyvinyl chloride or thermoplastic elastomer. However, the present disclosure is not limited thereto.

In some embodiments, the gasket 300 may be formed with a groove disposed on a side surface of the gasket 300, which is used to accommodate a piece of glass. In some embodiments, to form a gasket 300 with the groove, a shape of the cavity of the injection mold may be designed accordingly. However, the present disclosure is not limited thereto.

In some embodiments, the method for forming the encapsulation assembly may further include: fastening a bright trim to the reinforce component 100. That is, the bright trim, the gasket 300 and the reinforcement component 100 constitute the encapsulation assembly.

In an embodiment, a vehicle window is provided. The vehicle window includes: a glass; and the encapsulation assembly formed by the above method.

Figure 4:
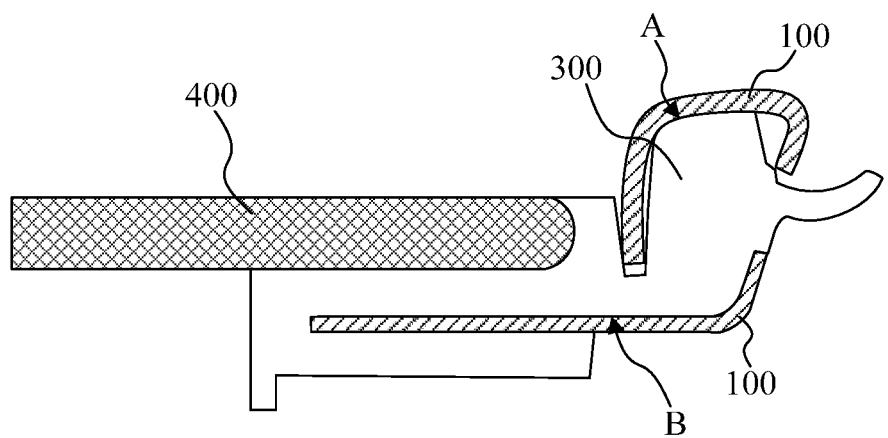

Referring to FIG. 4, the gasket 300 encapsulates edges of the glass 400, and is closely bound with the rigid reinforcement component 100. The rigid reinforcement component 100 supports the gasket 300, such that the gasket 300 can remain its original shape in use. Besides, the reinforcement component 100 may provide a stable mounting location for other components, such as a bright trim or a pin. In addition, the reinforcement component 100 can be disposed into a mold with the glass in an injection molding process, so that the gasket 300 can encapsulate the reinforcement component 100. Therefore, the method may not increase process complexity.

As described above, the primer layer 200 is formed on a contact surface between the reinforcement component 100 and the gasket 300 (i.e., the surface to which arrows A and B point in FIG. 4). As the reinforcement component 100 which has the primer layer 200 formed thereon is heated to elevate the temperature of the reinforcement component 100, the primer layer 200 is activated, such that the gasket 300 and the primer layer 200 may bind with each other more tightly. That is to say, the binding force between the reinforcement component 100 and the gasket 300 may be enhanced. In this way, the gasket 300 does not easily detach from the reinforcement component 100, the formed encapsulation assembly may be more durable, and safety of the vehicle window may be improved.

In some embodiments, the vehicle window may further include a bright trim which is fastened to the reinforcement component 100. In some embodiments, after the glass 400 which is encapsulated by the gasket 300 and the reinforcement component 100, as shown in FIG. 4, is taken out of the cavity of the mold, the bright trim is fastened to the reinforcement component 100 which provides a stable mounting location for the bright trim. In above embodiments, the vehicle window includes the bright trim. However, the present disclosure is not limited thereto.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure. Therefore, the protection scope of the present disclosure is subject to the scope defined by the claims.

What is claimed is:

1. A method for forming an encapsulation assembly, comprising:
    providing a reinforcement component;
    forming a primer layer covering a surface of the reinforcement component;
    performing a heating treatment on the reinforcement component after the primer layer is formed, to elevate a temperature of the reinforcement component; and
    injecting a gasket material in a mold onto the surface of the reinforcement component with elevated temperature to form a gasket;
    wherein providing a reinforcement component comprises providing the reinforcement component which has an antirust layer formed thereon; and forming a primer layer covering the surface of the reinforcement component comprises forming the primer layer after forming the antirust layer on the reinforcement component so that the primer layer covers the surface of the reinforcement component which has the antirust layer formed thereon, the primer layer being formed between, and in contact with, the antirust layer and the gasket; wherein the antirust layer comprises epoxy resin;
    wherein forming a primer material on the surface of the reinforcement component comprises:
    forming a primer material with a water-base solvent which comprises chlorinated polyolefin or polyolefin-silicane; or
    forming a primer material with a solvent-base solvent which comprises polyurethane and/or a precursor of polyurethane.

2. The method according to claim 1, wherein before the primer layer is formed covering the surface of the reinforcement component which has the antirust layer formed thereon, and after the reinforcement component which has the antirust layer formed on the surface thereof is provided, the method further comprises: cleaning a surface of the antirust layer.

3. The method according to claim 1, wherein the primer layer is formed covering the surface of the reinforcement component by a coating process, a spraying process or a dipping process.

4. The method according to claim 1, wherein forming a primer layer covering a surface of the reinforcement component comprises:
   performing a drying treatment on the primer material to make a solvent in the primer material volatilize to form the primer layer.

5. The method according to claim 4, wherein performing a drying treatment on the primer material comprises:
   laying the reinforcement component aside which has the primer material formed on the surface thereof for a duration ranging from half an hour to forty-eight hours, to make the solvent in the primer material volatilize.

6. The method according to claim 1, wherein performing a heating treatment on the reinforcement component comprises: elevating the temperature of the reinforcement component to 60° C. to 90° C.

7. The method according to claim 1, wherein performing a heating treatment on the reinforcement component comprises: heating the reinforcement component which has the primer material formed thereon in a baking oven.

8. The method according to claim 1, wherein the gasket comprises polyvinyl chloride or thermoplastic elastomer.

9. The method according to claim 1, wherein the gasket is formed with a groove disposed on a side surface of the gasket, the groove being used to accommodate a piece of glass.

10. The method according to claim 1, further comprising: fastening a trim to the reinforce component.

\* \* \* \* \*